Patented June 1, 1943

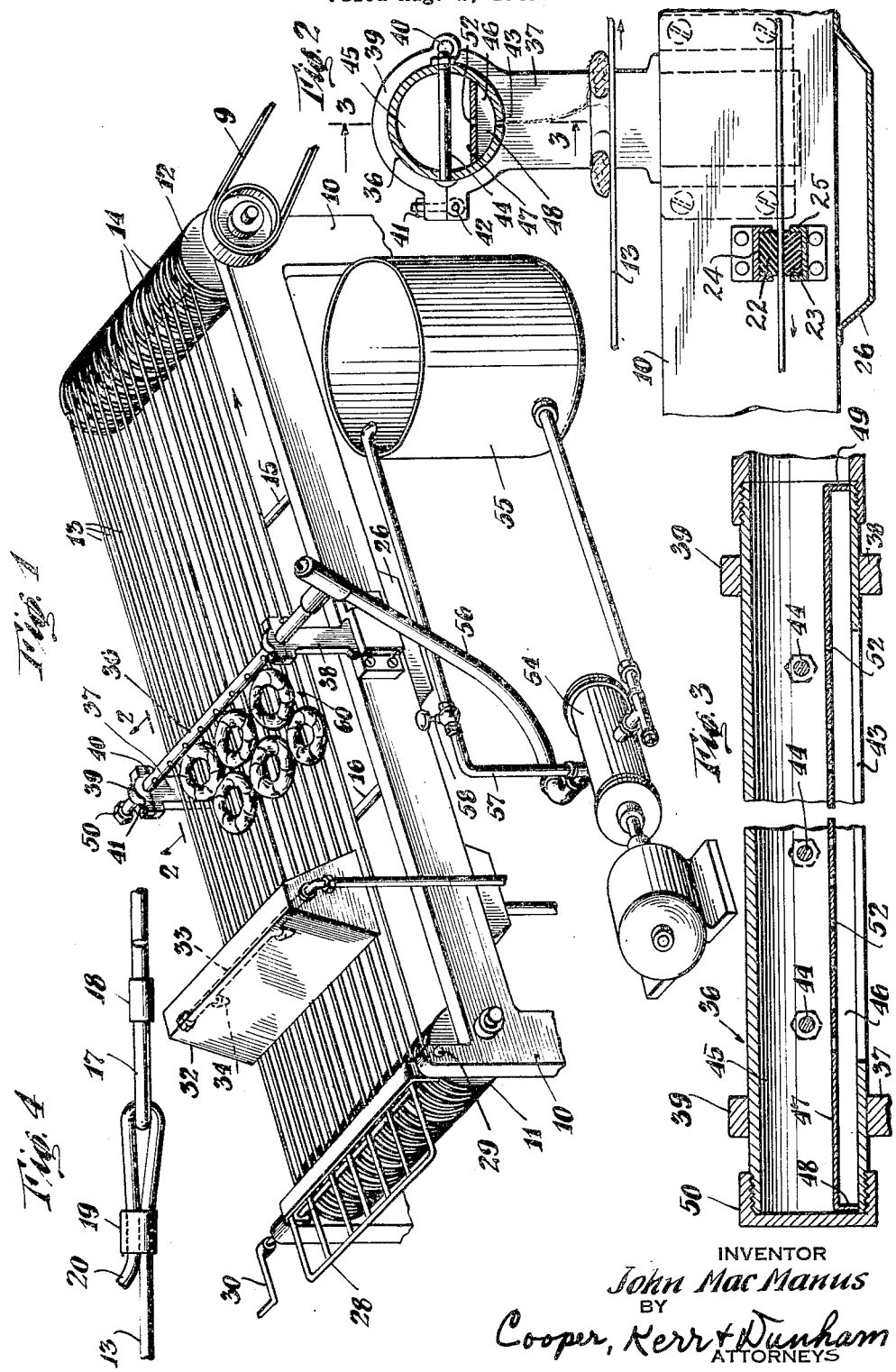

2,320,529

UNITED STATES PATENT OFFICE 2,320,529

PASTRY ICING APPARATUS

John MacManus, Yonkers, N. Y., assignor to Cushman's Sons Inc., New York, N. Y., a corporation of New York Application August 2, 1940, Serial No. 349,611

2 Claims. (Cl. 91—2)

This invention relates to apparatus for icing pastry.

One of the objects of this invention is to apply icing to a continuous stream of pastry products without interrupting the progress of the stream or the continuous application of icing.

Another object of the invention is to provide a controlled film of icing to several pieces of pastry at a time and for indefinite periods of operation.

Another object of the invention is to provide an open mesh conveyor for carrying pastry to be covered with a fluid dressing and icing and which is adapted for self-cleaning.

Further and other objects of the present invention will be hereinafter set forth in the accompanying specification and claims and demonstrated by the drawing which shows by way of illustration the preferred embodiment and the principle of my invention, and what I now consider the best mode in which I have contemplated applying that principle. Other embodiments of the invention employing the same principle may be used, and structural changes made as desired by those skilled in the art within the spirit of the appended claims and without departing from the present invention.

In the drawing, Fig. 1 illustrates a perspective view of the apparatus.

Fig. 2 is a section on line 2—2 of Fig. 1.

Fig. 3 is a longitudinal section through the icing discharge conduit taken on line 3—3 of Fig. 2, and Fig. 4 is a detail showing the manner of connecting the ends of the wire strands of the conveyor.

The conveyor is mounted upon a frame 10 which stands upon the floor and is made of stiff structural members, such as channel-irons. The frame carries at its ends pulleys 11 and 12. In the present embodiment of the invention each pulley consists of a steel roller about nine inches in diameter. The conveying surface of the conveyor consists solely of a number of parallel strands 13. Each of these strands engages a groove 14 which is cut in each of the pulleys 11 and 12.

The pulleys are similar to each other and each pulley has as many grooves as are necessary to accommodate the desired number of strands. In my present apparatus the grooves are equally spaced at intervals of ⅜ of an inch but for conveying and icing most pastries is suffices to pass a strand over every other groove. The spacing of the strands affords a high percent of open area in the conveyor surface and also facilitates cleaning. The pulleys are carried in journals secured to the frame 10 and power means 9 is provided for rotating pulley 12 to drive the conveyor.

The frame may be of any convenient length and in order to prevent sagging of the strands, rollers 15 and 16 may be used. These extend from one longitudinal frame member to the other and are directly beneath and in contact with the strands.

For use as strands I have found a wire of hardened steel having a diameter of .051 of an inch to be satisfactory. Each wire is in the form of a closed loop and is entirely separate from any other wire. It is sufficiently tensioned to serve as a part of the conveyor surface and to have functional contact with the driving pulley 12 for traction purposes.

Individual adjustment of each wire is necessary, and this is accomplished by providing engaging loops or bights at each of the connecting ends. This construction is illustrated in Fig. 4. A loop is first made at one end as at 17, and secured by a ferrule 18. The free end of the wire is bent away from the wire to augment the holding force of the ferrule. The other end of the wire is passed through a ferrule 19, then through the loop 17, then back through ferrule 19. When the proper degree of tension has been applied to the wire, the ferrule 19 is clamped tightly to close the connection and this is made secure by bending the free end 20 away from the main portion of the wire, as illustrated in Fig. 4. This form of connection facilitates the task of introducing the same amount of tension in all of the wires so that all of the wires will be pulled upon operation of the driving pulley. Another advantage of the connection resides in the hinge effect provided thereby which is a desirable characteristic for smooth operation over the pulleys.

The return path of the strands may be readily seen in Fig. 2. One advantage of the conveyor is the facility by which it may be cleaned. The cleaning members consist of a pair of strips of rubber 22, 23 (Fig. 2), one overlying and one underlying the strands and in contact with each other and with the strands. These strips of rubber extend across the conveyor and serve to clean all of the strands. They are supported and backed up by a pair of channel members 24, 25 which have their ends fastened to the longitudinal members of frame 10. The rubber strips serve as a squeegee for scraping and removing such icing and fluid materials as happen to be carried by the strands. The material scraped from the strands is collected in a pan 26 provided for that purpose.

The head end of the conveyor frame is preferably provided with a rack 28 which is pivotally mounted at 29. A handle 30 is provided for rocking the rack. When pastry is baked and taken from the oven, the attendant removes the same from its pans by overturning the pans upon the rack. The pastry is then transferred to the conveyor by rocking the rack. This dumping action turns the pastry right side up upon the travelling conveyor.

The individual pieces of pastry are grouped together so as to cover as much of the conveyor surface as possible so that the droppings through the conveyor shall be a minimum. The first step of applying icing to the pastry involves the application of a sugar solution or other sticky fluid. This is applied by passing the pastry under a hood 32 which encloses a conduit 33 and suitable nozzles 34 from which the fluid is sprayed. The entire atmosphere under the hood resembles a mist from which fluid deposits evenly over the pastry. This fluid serves as a bond for the icing which is subsequently applied.

As the conveyor travels ahead, the pastry is carried to the icing station. At this point a film of icing is applied. The means for applying the icing includes a conduit 36 which extends across and above the conveyor. This conduit is supported at its ends by brackets 37, 38 and the conduit is held in place by disconnectable cap pieces 39 (Fig. 2). All parts are made easily accessible for cleaning purposes. Each cap 39 is pivoted at 40, and an eye bolt 41 which is pivoted at 42 provides means for readily removing the conduit for cleaning purposes.

The discharge opening of the conduit consists of a narrow slot 43 extending approximately the width of the conveyor. A series of bolts 44 which pass through opposite sides of the conduit serve as means for making adjustment of the width of the slot 43 and for holding the slot from spreading under hydrostatic head of the icing fluid within the conduit.

The conduit is divided into two chambers 45 and 46 which are separated by a perforated strip 47. The longitudinal edges of this strip rest upon the wall of the lower half of the conduit (see Fig. 2), and the ends 48, 49 of the strip are turned downwardly and shaped to fit the inner curvature of the conduit (Fig. 3). These turned-down ends cut off communication between the two chambers 45 and 46 at the ends of the partitioning strip, as well as give additional support to the strip. The strip may be taken from within the conduit for cleaning purposes by removing the screw cap 50 at the end of the conduit.

The fluid icing is forced into chamber 45 under pressure and uniform distribution of the icing throughout the length of the slot is had because of the progressive increase in the size of the openings 52 from the point of entry of the icing within the conduit. The icing in its fluid form as introduced within the discharge conduit is relatively viscous and as the discharge slot 43 is narrow, pressure is necessary for discharging icing. A slot of about .017 of an inch provides a film which is thin enough to break as the advancing pastry is coated. The icing is actually laid upon the pastry as it issues in a thin film from the slot. It leaves the slot as an unbroken ribbon which becomes attenuated and irregularly perforated as it drapes itself over the irregular contours of the pastry.

A pressure head upon the discharging icing may be maintained in any convenient manner. As illustrated in the drawing, the pressure head is maintained by a continually-operating pump 54 which receives the icing from a source of supply or tank 55 and conducts it under pressure through conduit 56 and into the discharge conduit 36. A screw pump capable of maintaining constant pressure is preferred. The discharge side of the pump has a by-pass line 57 provided with a valve 58 by which the pressure of the discharge may be regulated. This by-pass leads back to the source of supply.

In order to maintain a continuous discharge of a film of icing of uniform thickness, it is necessary that the pressure be maintained substantially constant. Because of the character of the icing the film of icing descending upon the pastry will adapt itself to the contour of the tops of the pieces of pastry and only occasionally will some of the fluid icing drop to the conveyor. Very little such icing which does not adhere to the pastry remains upon the strands. The container 26 is provided for receiving the droppings. These occur mostly because of gaps in the spacing of pieces of pastry upon the conveyor, such as, for example, at 60, or when there is a break in the sequence of pastry pieces travelling on the conveyor.

The various dimensions mentioned herein are merely for the purpose of illustration and it is to be understood that variation is expected to be made in applying the principles of the invention. As, for example, the size of wire is a function of the kind of material of which the wire is made, the length of span of the conveyor, etc., and the width of the slot in the conduit from which the icing issues is dependent upon the viscosity of the icing and the pressure employed to discharge the icing from the conduit. All such and like variations are within the scope of the invention.

What is claimed is:

1. In apparatus for applying a layer of icing to pastry products and having a travelling conveyor for carrying pastry products and means for driving said conveyor, the combination comprising means mounted above said conveyor for forming a relatively thin sheet of icing, said forming means comprising a conduit extending transversely of said conveyor and provided with a slot extending longitudinally thereof at its under portion for discharging icing in ribbon form over the pastry products carried by said conveyor, means within said slotted conduit for insuring uniform pressure throughout the length of the longitudinal discharge slot, said means comprising a perforated member separating the discharge conduit into two compartments, one of said compartments being in communication with the ingress side of the conduit and the other of said compartments being in communication with the discharge slot, a source of supply of icing, and pump means for maintaining a continuous flow of icing from said source of supply to said first-named compartment, through the second-named compartment and through the discharge slot in said conduit.

2. In apparatus for applying a layer of icing to pastry products and having a travelling conveyor for carrying pastry products and means for driving said conveyor, the combination comprising means mounted above said conveyor for forming a film of icing, said forming means comprising a conduit extending transversely of said conveyor and provided with a relatively narrow slot extending longitudinally thereof at its under portion for discharging the film of icing over the pastry products carried by said conveyor, means within said slotted conduit for causing distribution of icing uniformly throughout the length of said longitudinal discharge slot, a source of supply of icing, and means for supplying icing from said source to said discharge conduit, said means having provision for maintaining a substantially constant pressure upon the icing being delivered to said discharge conduit so as to maintain the flow of icing from said relatively narrow slot in a continuous film.

JOHN MacMANUS.